United States Patent Office 3,440,155
Patented Apr. 22, 1969

3,440,155
EXTRACTION AND RECOVERY OF METALS FROM ORES, CONCENTRATES AND RESIDUES
Ralph W. Pickering, Sandy Bay, Tasmania, and John S. Pidgeon, Mount Stuart, Tasmania, Australia, assignors to Electrolytic Zinc Company of Australia Limited, Melbourne, Victoria, Australia
No Drawing. Filed Mar. 15, 1966, Ser. No. 534,411
Claims priority, application Australia, Apr. 6, 1965, 57,275/65
Int. Cl. C22d 1/24; C22b 13/04
U.S. Cl. 204—119
6 Claims

ABSTRACT OF THE DISCLOSURE

This invention utilizes selected mixtures of ammonium sulphate, ammonia and water to dissolve lead sulphate from lead-bearing ores, residues or the like to produce solutions containing up to 100 gm. /l. Pb and thus to separate the lead sulphate from other, undesirable, components of the starting material. After separation of the lead-bearing solution from the insoluble portion of the starting material, the lead may be recovered from the solution by removal of ammonia or by electrolysis.

---

This invention involves the use of aqueous ammoniacal ammonium sulphate solutions of selected compositions for the extraction of lead and associated metal values from lead-bearing ores, concentrates, calcines, sinters, drosses and like materials (hereinafter referred to as lead-bearing materials) and to the subsequent separation and recovery of lead and other metal values from solution.

Almost all metallic lead has previously been produced by pyrometallurgical techniques. Lead smelting, in common with all smelting processes is limited in its ability to treat low grade materials because of the cost of fuel and difficulty of converting gangue and similar materials into molten slag to permit separation from the metallic lead. Recovery of valuable by-products from the slag is often not economically practicable.

Lead may also be recovered from ores by a hydrometallurgical technique in which the sulphide is oxidized to the sulphate either as a suspension in a suitable aqueous solution or by roasting and the lead sulphate subsequently dissolved in an aqueous solution of alkylene amines. The lead may be removed from solution as a basic carbonate and subsequently reduced to metallic lead. This method of lead production has a number of disadvantages which include the relatively high cost of the leaching agent, of the lime used for amine regeneration and of the carbon dioxide used.

The method of the present invention of extracting lead and other metal values from lead-bearing materials typically includes the following steps: pretreatment (if necessary) by known techniques to ensure the conversion of the lead in the starting material to the oxide, hydroxide, sulphate or a basic sulphate. (Such materials are hereinafter referred to as suitable lead compounds); washing (if necessary) to remove soluble undesirable products; leaching and dissolution of these resulting lead compounds in an aqueous ammoniacal ammonium sulphate solution of selected composition (hereinafter referred to as an AAS solution); the separation of the undissolved residue from the pregnant AAS solution; the washing of the residue in at least two stages; the removal (if necessary) of certain impurities from the pregnant AAS solution; the precipitation of lead or lead compounds by selected methods; the recovery of ammonia and ammonium sulphate for recycling; the purification of recycle solutions by known methods; the recovery by evaporation and crystallisation of surplus ammonium sulphate produced. The residue from the first leaching step may be suspended in a solution containing ammonia and ammonium sulphate and subjected further to oxidising conditions in an autoclave, then releached with AAS solutions to obtain enhanced extractions.

The present invention accordingly provides a method of extracting lead from lead-bearing materials comprising the step of leaching material containing suitable lead compounds with aqueous ammoniacal ammonium sulphate solution, said solution preferably containing from 10 to 350 gms. per litre total sulphate and from 90 to 450 gms. per litre total $NH_3+NH_4$ expressed as $NH_3$ and more preferably from 75 to 300 gms. per litre total sulphate and from 200 to 300 gms. per litre total $NH_3+NH_4$ expressed as $NH_3$. Where the lead-bearing materials contain associated metal values soluble, either before or after pretreatment, in the leaching solution, said associated metal values may also be extracted by this method.

The pretreatment step (when necessary) is to ensure that the lead in the lead-bearing materials is present as a suitable lead compound. Many materials such as residues, sinters, calcines and drosses already contain the lead in a suitable form and in such cases pretreatment would not be necessary.

Since lead sulphide is not directly soluble in AAS solutions, such sulphide materials require pretreatment by known techniques such as—

(a) Roasting or atmospheric oxidation
(b) Oxidation in an autoclave of a suspension in sulphuric acid, or in a solution containing ammonia and/or ammonium sulphate
(c) Use of solutions of oxidants such as ferric sulphate.

Similarly, if lead is present as carbonate, treatment by roasting or with sulphuric acid would be necessary to yield suitable lead compounds.

Some raw materials and some materials after the pretreatment may contain sufficient soluble copper and zinc compounds to depress the solubility of suitable lead compounds in AAS solutions and thus adversely affect the leaching step. In such circumstances a washing step using water or dilute aqueous ammonia should be employed immediately prior to the leaching step.

The leaching step consists of the dispersion of the finely ground material from any previous steps in an AAS solution in a covered and agitated vessel. Lead and other metal values are rapidly extracted from the material being treated and dissolve in the AAS solution.

Iron compounds, silica and other insolubles may be readily separated by filtration or by some similar method. This insoluble residue may conveniently be washed in at least two steps; firstly with AAS solution to ensure complete extraction of dissolved lead compounds and secondly with water to recover entrained ammonia and ammonium sulphate. The final aqueous wash liquors preferably should not be mixed with the primary filtrate or the first wash liquors, as precipitation of some lead compound may occur, but should be returned to any convenient point in the circuit.

In one method of applying the process of the present invention to sulphide materials, the oxidation and dissolution processes may be combined by heating lead sulphide as a susepnsion in a suitable aqueous ammonical ammonium sulphate solution preferably at 150 to 200° C. thus obtaining in one operation a lead rich solution from a sulphide material.

The sequence of operations used to recover metal values from the pregnant AAS solution will depend upon the composition of the material being treated, but in all circumstances the separation of lead values will depend upon the properties of AAS solutions which it is now necessary to describe in further detail.

We have found that suitable lead compounds are quite substantially soluble in certain ammoniacal ammonium sulphate solutions. In general suitable lead compounds are more soluble the higher the combined concentrations of ammonia and ammonium sulphate but the solubility is greatly reduced if either the ammonia concentration or the ammonium sulphate concentration is too low.

We have found for instance that a solution can be produced of the following composition

SOLUTION 1

Total $NH_3+NH_4$ expressed as

| | Gms. per litre |
|---|---|
| Ammonia | 274 |
| Sulphate | 228 |
| Lead | 129 |

The concentration of lead is reduced, if for instance, the ammonia concentration is too low as in Solution 2.

SOLUTION 2

Total $NH_3+NH_4$ expressed as

| | Gms. per litre |
|---|---|
| Ammonia | 83 |
| Sulphate | 179 |
| Lead | 2 |

Likewise the concentration of lead is reduced if the ammonium sulphate concentration is too low as in Solution 3.

SOLUTION 3

Total $NH_3+NH_4$ expressed as

| | Gms. per litre |
|---|---|
| Ammonia | 246 |
| Sulphate | 18 |
| Lead | 2 |

Also, of course, the solubility of suitable lead compounds is low if the concentrations of both ammonia and ammonium sulphate are too low as in Solution 4.

SOLUTION 4

Total $NH_3+NH_4$ expressed as

| | Gms. per litre |
|---|---|
| Ammonia | 124 |
| Sulphate | 68 |
| Lead | 3 |

The solution compositions 1–4 were obtained at 20° C. at atmospheric pressure but similar solutions may be prepared at other temperatures.

Diagrams that represent the compositions of the solutions and the solid phases that may exist are too complicated for reproduction in easily understandable form. It is preferable therefore to define the compositions of solutions that are appropriate to the application of the process of this invention as being all those ammoniacal ammonium sulphate solutions that display this ability to dissolve lead in convenient amounts. All such solutions that can contain lead to the extent of more than (say) a concentration of 2 grams per litre are of some interest.

Generally, however, solutions that can contain over 80, preferably over 90 and particularly of the order of 100 grams of lead per litre are of even greater interest, and the more favourable applications of the process take advantage of these latter solutions.

Even higher solubilities may be achieved at higher temperatures. But such higher temperatures result in high pressures due to the presence of ammonia. Pressure vessels would be required.

Thus the aqueous ammoniacal ammonium sulphate solutions selected for the purpose of this invention and defined as an AAS solution lie within the concentration range

| | Gm./l. |
|---|---|
| Total sulphate | 10–350 |
| Total $(NH_3+NH_4)$ expressed as $NH_3$ | 90–450 |

It should be noted that the total sulphate concentration in such a solution may be derived from both lead sulphate and ammonium sulphate.

It is evident from the compositions of Solutions 1–4 that starting from a solution of composition near to that of Solution 1 the lead concentration of the solution may be reduced by a number of procedures, viz.

(a) by dilution with water so that both the sulphate and total ammonia concentrations are reduced.

(b) the addition of either ammonia or ammonium sulphate in large amounts.

(c) the removal of free ammonia, by heating, reduction of pressure, neutralisation with acid or the addition of materials such as zinc sulphate.

When ammonia is removed by distillation from a pregnant AAS solution the lead concentration is rapidly reduced due to the precipitation of lead sulphate or a basic lead sulphate. By extended heating of this precipitate in the presence of excess ammonium sulphate any basic sulphate may be converted to the normal sulphate. Thus some choice of product is available, depending upon the most desirable lead compound and on the sulphate requirements of a plant circuit. If a basic sulphate is produced then any net ammonium sulphate produced may be recovered by evaporation and crystallisation and is available for sale. Ammonium sulphate solution and ammonia rich gas produced during the precipitation of the lead sulphate may be recycled to the leaching step.

Pregnant AAS solutions may also be treated with metallic zinc to produce lead sponge and a solution which, after treatment by known methods, may be recycled for use in the leaching step.

The separation of lead or lead compounds from AAS solutions by any of the previously mentioned procedures may conveniently be preceded by the precipitation of any dissolved silver by means of metallic lead if the silver content of the original material makes such a step desirable.

Purification of recycled solution to prevent the accumulation of metal values other than those of lead may be conducted if the composition of the material being treated makes this step necessary or desirable. Such purification may be effected by the use of hydrogen sulphide to precipitate metal sulphides, or by an initial treatment with metallic zinc to remove impurities such as copper and cadmium followed by the removal of zinc as sulphide using hydrogen sulphide, as sulphite using sulphur dioxide, or as zinc ammonium sulphate by evaporation and crystallisation, or by other methods familiar to those skilled in the art.

A purification of recycled solution may serve as an alternative or an adjunct to the washing step following pretreatment.

Lead sulphate or basic lead sulphate produced by the previously described steps may be converted to metallic lead by a number of processes familiar to those skilled in the art viz—reduction with carbon or carbonaceous materials, reaction with lead sulphide, or by blending with the feed materials to the normal lead smelting procedures.

The following examples illustrate the use of AAS solutions for the leaching of suitable lead compounds from lead-bearing materials and the manner in which lead compounds or metallic lead may be recovered from the solution.

Example 1.—Leaching of a zinc plant residue

A zinc plant residue in which the lead is present almost entirely as lead sulphate was leached at ambient temperature for about one hour with an excess of an AAS solution (ammonium sulphate 260 gm./l., ammonia 140 gm./l. The composition of the residue before and after leaching is given in Table I.

TABLE I.—LEACHING OF ZINC PLANT RESIDUE

|  | Original residue | Leached residue |
|---|---|---|
| Pb | 26.15 | 0.70 |
| Zn | 8.8 | 7.8 |
| Fe | 7.9 | 7.9 |
| $SO_4$/S | 8.9 | 1.3 |
| S/S | 3.15 | 1.9 |

The lead extracted into solution was 97% of that originally contained in the residue.

Example 2.—Leaching of a roasted lead concentrate

A lead concentrate (column A Table II) was roasted in air at 600° C. for 4 hours to give a calcine (column B) which was leached at ambient temperature for one hour with an AAS solution (column C) to yield after filtration and washing a filter cake (column D) and a solution (columns E and F). The metal extractions calculated from the preceding data are given in column G.

Example 3.—Leaching of a lead concentrate after oxidation as a suspension in a solution containing ammonia and ammonium sulphate A lead concentrate (column A Table III) was oxidised as a suspension in a solution containing ammonia and ammonium sulphate in an autoclave under the following conditions:

Pulp density _____ gm./l__ 450
Temperature _____ ° C__ 200
Oxygen press _____ p.s.i__ 70
Total press _____ p.s.i__ 370
$(NH_4)_2SO_4$ _____ gm./l__ 430
$NH_3$ _____ gm./l__ 50
Time _____ hrs__ 4

After treatment the contents of the autoclave were removed and dried for convenience of handling, to give the oxidised concentrate plus solids from solution (column B). This material (column B) was mixed with a solution (column C) such that the solution together with the ammonium sulphate contained in the material (column B) gave an AAS solution suitable for leaching. Leaching was carried out at ambient temperatures for one hour to yield, after filtration and washing, a filter cake (column D), a solution (columns E and F) and the extractions indicated in column G.

TABLE II.—LEACHING OF A ROASTED LEAD CONCENTRATE

|  | Lead concentrate | Roasted lead concentrate | AAS soln. | Filter cake | Solution | Solution gm./l. | Percentage extraction |
|---|---|---|---|---|---|---|---|
|  | A | B | C | D | E | F | G |
| Pb | 55.3 | 55.3 |  | 4.8 | 50.5 | 94.7 | 91 |
| Ag | *29 |  |  | *27 |  |  | 6 |
| Zn | 16.6 | 16.6 |  | 4.2 | 12.4 | 23.2 | 75 |
| Cu | 0.87 | 0.87 |  | 0.39 | 0.48 | 0.91 | 50 |
| Fe | 4.3 | 4.3 |  | 4.3 |  |  |  |
| $SO_4$ | 1.2 | 30.1 | 130 | 1.35 | 159 | 299 |  |
| Sulphide | 19.9 | 0.4 |  | 0.4 |  |  |  |
| Total $(NH_3+NH_4)$ as $NH_3$ |  |  | 131 |  | 131 | 246 |  |
| $H_2O$ |  |  | 309 |  | 309 | 584 |  |
| Total wt | 100 | 110 | 573 | 19.5 | 673 |  |  |
| Total vol |  |  |  | †0.534 |  |  |  |

*Oz./ton.  †Litres.

NOTE.—All figures in columns A to E incl. are gms. per 100 gms. of original concentrate.

The filter cake (column D) was later suspended in a solution containing ammonia and ammonium sulphate

TABLE III.—LEACHING OF LEAD CONCENTRATE AFTER OXIDATION IN AQUEOUS SLURRY

|  | Lead concentrate | Oxidised concentrate plus solids from soln. | AAS soln. | Filter cake | Solution | Solution, gms./l. | Extraction, Percent |
|---|---|---|---|---|---|---|---|
|  | A | B | C | D | E | F | G |
| Pb | 55.3 | 55.3 |  | 5.25 | 50.1 | 96.8 | 91 |
| Ag | *29 | not detd. |  | *28 |  |  | 3 |
| Zn | 16.6 | 16.6 |  | 0.71 | 15.9 | 30.1 | 96 |
| Cu | 0.87 | 0.87 |  | 0.33 | 0.55 | 1.06 | 63 |
| Fe | 4.3 | 4.3 |  | 43 |  |  |  |
| $SO_4$ | 1.2 | 110 | 44.8 | 3.16 | 151.9 | 294 |  |
| Total $(NH_3+NH_4)$ as $NH_3$ |  | 23.6 | 99.4 |  | 123.9 | 238 |  |
| $H_2O$ |  |  | 299 |  | 299 | 582 |  |
| Total wt | 100 | 216 | 455 | 18.1 | 653 |  |  |
| Total vol |  |  |  |  | †(0.516) |  |  |
| Sulphide | 19.9 | 0.5 |  | 0.5 |  |  |  |

*Oz./ton.  †Litres.

NOTE.—All figures in columns A to E incl. are gms. per 100 gms. of original concentrate.

and further oxidised until it contained less than 0.02 mg. sulfur as sulphide per 100 gm. of original concentrate (column A). The conditions of the oxidation were Pulp density 70 gms./l.; oxygen pressure 70 p.s.i.g.; $(NH_4)_2SO_4$ concn. 430 gms./l.; total pressure 370 p.s.i.g.; $NH_3$ concn. 50 gms./l.; time 4 hours; temp. 200° C.

The resulting material was then mixed with additional aqueous ammonia and ammonium sulphate to give an AAS solution containing ammonium sulphate 328 gms./l.; and ammonia 240 gms./l.—and leaching conducted for 1 hour at ambient temperature. The following overall extractions, based on the original lead concentrate, were then obtained—lead 98%, silver 98%, zinc 88%, copper 78%.

The filter cake (column D) was further subjected to treatment under the same conditions as those used to treat the filter cake of Example 2 to lower the sulphide content to the same low level. After this oxidation treatment the leaching treatment as given to the filer cake of Example 2 was repeated to obtain the following overall extractions based on the original lead concentrate: Lead, 98%; silver, 93%, zinc, 99%; copper 99%.

Example 4.—Recovery of substantially pure basic lead sulphate, ammonium sulphate solution and ammonia from a pregnant AAS solution Samples of a pregnant AAS solution were heated in a simple pot still to drive off ammonia. The composition of the solids liquids and vapours were determined for various temperatures of operation and are given in Table IV.

TABLE IV.—RECOVERY OF MONO-BASIC LEAD SULPHATE FROM PREGNANT AAS SOLUTIONS

| | Feed | Products | | | | | |
|---|---|---|---|---|---|---|---|
| Vapour temp., ° C | 20 | 50 | 55 | 60 | 70 | 80 | 90 |
| Soln. composition: | | | | | | | |
| $SO_4$, g.p.l | 298 | 294 | 304 | 310 | 318 | 317 | 295 |
| Total $(NH_3+NH_4)$ as $NH_3$, g.p.l | 180 | 170 | 160 | 150 | 140 | 130 | 115 |
| Pb, g.p.l | 80.8 | 34.0 | 21.4 | 13.1 | 5.1 | 2.0 | 0.5 |
| Zn, g.p.l | 28.5 | 25.1 | 26.2 | 26.6 | 27.3 | 28.0 | 30.4 |
| Cu, g.p.l | 12.6 | 12.8 | 13.1 | 93.6 | 13.9 | 14.3 | 15.4 |
| Gm. of vapour/litre of feed | | 30 | 52 | 72 | 95 | 117 | 114 |
| $NH_3$ in vapour, percent | | 73.3 | 73.7 | 73.7 | 73.7 | 68.9 | 62.8 |
| Gms. of dry washed solids/litre feed | | 65 | 81 | 90 | 100 | 118 | 163 |
| Composition of dry washed Solids: | | | | | | | |
| $SO_4$, percent | | 18.1 | 18.1 | 18.1 | 18.1 | 27.6 | 42.3 |
| $NH_3$, percent | | 0.1 | 0.1 | 0.2 | 0.05 | 1.6 | 5.5 |
| Pb, percent | | 77.2 | 77.4 | 78.4 | 78.0 | 68.6 | 49.6 |
| Zn, percent | | 0.1 | 0.1 | 0.2 | 0.2 | 0.3 | 0.7 |
| Cu, percent | | 0.03 | 0.02 | 0.03 | 0.02 | 0.04 | 0.13 |

Example 5.—Conversion of basic lead sulphate to normal lead sulphate

Twenty grams of mono-basic lead sulphate prepared by the boiling of a pregnant AAS solution were boiled with 200 mls. of a 450 gm./l. ammonium sulphate solution for 40 minutes. The progressive change of composition of the solid is indicated by the data in Table V.

TABLE V.—CONVERSION OF BASIC TO NORMAL LEAD SULPHATE

| Time of Boiling, mins. | Boiling Pt., ° C. | Washed Solids Composition, Percent | | |
|---|---|---|---|---|
| | | Pb | $SO_4$ | $NH_3$ |
| 0 | 98 | 78.7 | 18.3 | |
| 5 | 102 | 64.6 | 35.1 | 3.05 |
| 15 | 104 | 64.0 | 32.5 | 1.80 |
| 40 | 104 | 68.8 | 31.1 | 0.40 |

The small ammonia content of the solids is probably due to the presence of a small amount of double salt of lead and ammonium.

Example 6.—Recovery of metallic lead from pregnant AAS solutions by cementation with zinc dust Two tests were caried out in which coarse zince dust was added to an AAS solution in which the lead concentration was 99.4 gms./l. and allowed to stand. The results given in Table VI indicate an almost complete separation of lead from solution by means of a stoichiometric addition of zinc dust.

TABLE VI.—REMOVAL OF LEAD FROM AAS SOLUTION WITH ZINC DUST

| Zn Addition | Final Soln. Analysis | |
|---|---|---|
| | Pb, mgm./l. | Zn, gm./l. |
| Stoichiometric | 10 | 31.2 |
| Twice Stoichiometric | 20 | 32.1 |

Example 7.—Recovery of metallic lead from pregnant AAS solutions by electrolysis Using stainless steel electrodes 100 mls. of an AAS solution of composition:

100 gm./l. Pb
200 gm./l. total $(NH_3+NH_4)$ as $NH_3$
300 gm./l. $SO_4$ were electrolysed.

The following results were obtained:

| Current, amps. | Potential, volts | Current Density, amps./sq. ft. | Metallic lead deposited at cathode, gms. | $PbO_2$ deposited at anode, gms. |
|---|---|---|---|---|
| 0.2 | 1.8 | 30 | 0.122 | 0.160 |
| 0.35 | 1.9 | 50 | 0.58 | 0.592 |

Using the same electrodes but as AAS solution containing the following:

20 gm./l. Pb
20 gm./l. total $(NH_3+NH_4)$ as $NH_3$
280 gm./l. $SO_4$

The following results were obtained:

| | |
|---|---|
| Current | 0.35 |
| Potential volts | 2.2 |
| Current density, amps/sq. ft. | 50 |
| Metallic lead deposited at cathode, gms. | 0.349 |
| $PbO_2$ deposited at anode, gm. | 0.0956 |

We claim:
1. Method of extracting lead values from lead-bearing ore materials which comprises leaching a material containing at least one lead compound of the group consisting of lead oxide, lead hydroxide, lead sulphate and basic lead sulphate with aqueous ammoniacal ammonium sulphate solution to produce a solution containing more than 2 gm./l. of lead.

2. Method of extracting lead values from lead-bearing materials as defined in claim 1, wherein the lead bearing ammoniacal ammonium sulphate solution contains 10 to 350 gm./l. total sulphate, 130 to 400 gm./l. total $(NH_3+NH_4)$ expressed as $NH_3$, and 2 to 100 gm./l. dissolved lead.

3. Method according to claim 1 in which the said material containing at least one lead compound is leached at a temperature above 15° C.

4. Method according to claim 1 in which the said lead bearing ammoniacal ammonium sulphate solution is electrolyzed to produce metallic lead.

5. Method according to claim 2 in which the said lead-bearing ammoniacal ammonium sulphate solution is treated with water to cause precipitation of lead compounds from solution.

6. Method according to claim 2 in which the said lead-bearing ammoniacal ammonium sulphate solution is treated by distillation or evaporation to lower its ammonia content thereby precipitating lead compounds from solution.

References Cited

UNITED STATES PATENTS 1,565,353  12/1925  Estelle _____ 23—127
2,950,964  8/1960  Forward et al. _____ 75—103
3,241,951  3/1966  Forward et al. _____ 75—120

L. DEWAYNE RUTLEDGE, Primary Examiner.

T. R. FRYE, Assistant Examiner.

U.S. Cl. X.R.

23—51, 146; 75—103, 120